United States Patent
Peevers et al.

(10) Patent No.: US 6,369,822 B1
(45) Date of Patent: Apr. 9, 2002

(54) AUDIO-DRIVEN VISUAL REPRESENTATIONS

(75) Inventors: Alan Peevers, Santa Cruz, CA (US); Alan Seefeldt, Somerville, MA (US)

(73) Assignee: Creative Technology Ltd. (SG)

( * ) Notice: Subject to any disclaimer, the term of this patent is extended or adjusted under 35 U.S.C. 154(b) by 0 days.

(21) Appl. No.: 09/373,405

(22) Filed: Aug. 12, 1999

(51) Int. Cl.[7] .............................................. G06T 17/00
(52) U.S. Cl. ...................................................... 345/473
(58) Field of Search ................................. 345/418, 420, 345/421, 422, 427, 473, 474, 475

(56) References Cited

U.S. PATENT DOCUMENTS 5,880,788 A * 3/1999 Bregler ........................ 345/473
6,226,008 B1 * 5/2001 Watanabe et al. ............ 342/427

* cited by examiner

*Primary Examiner*—Cliff N. Vo
(74) *Attorney, Agent, or Firm*—Townsend and Townsend and Crew LLP (57) ABSTRACT

A method and system to drive transformations of a visual representation, in real-time, that synchronizes the audio and visual outputs and controls the magnitude of object deformation to be visual pleasing. In one embodiment, sudden increases in the spectral energy are detected to time the initialization of deformations and a smoothed signal is derived from the time varying spectral energy curve to control the magnitude of the deformations.

18 Claims, 3 Drawing Sheets

AUDIO-DRIVEN VISUAL REPRESENTATIONS

BACKGROUND OF THE INVENTION

The present invention relates to electronic transformation of images. More particularly, the present invention is directed to electronic transformations of images in response to time varying signals, such as audio signals.

Audio-visual entertainment is one of the most enduring forms of entertainment dating back to the days of yore when history was passed down through a combination of song and dance. Modern television and motion pictures are the progeny of the early days of song and dance, using a combination of audio information and video information to provide an entertaining experience for audiences world-wide. Traditionally, the video information and the audio information were created independent of each other. In the shadows of the motion picture industry evolved a profession in which sound-tracks were tailored for a pre-existing motion picture. In the early 1980's, this process was reversed when recording companies introduced a new marketing technique, the rock-video. In the rock-video, a short story, or collage of visual effects, would be associated with a pre-existing sound-track. In both of the aforementioned audio-video products, the audio and video information is synchronized to maximize the enjoyment of the audio-visual experience, requiring a great deal of human labor.

With the prevalence of the personal computer, audio-visual entertainment has been revolutionized with the introduction of interactive games, MPEG algorithms, and MP-3 algorithms and the like. More recently, the flexibility provided by the personal computer in creating audio-visual entertainment has been enhanced with development of computationally efficient algorithms, such as geometric transformation algorithms described in U.S. Pat. No. 5,204,944 to Wolberg et al. These algorithms have facilitated computer-generated animations that employ image transformations to enhance the enjoyment of personal computing as a portion of an interactive game or as a stand-alone application. Image transformations involve varying the visual representation of a two-dimensional (2-D) image using either 2-D or 3-D techniques. Transformations associated with 2-D images include image translation, scaling and rotation, and transformations associated with three-dimensional images include the aforementioned transformations, as well as bending, twisting and other more complicated modifications.

More recently, image transformations have been described as being desirable to synchronize with music in an automated fashion. To that end, a system was developed to generate movies in non-real-time. As a first step, a piece of music is analyzed in non-real-time by a computer program to extract a constant tempo and the energy of the associated beats within multiple frequency bands. Control signals are then triggered at these computed beat-times, and the amplitude of a control signal is proportional to the energy in the associated frequency band. These control signals vary smoothly over time and are used as inputs to a rendering program which varies the geometry of a pre-defined graphics scene. These geometry variations include changing an object's position, applying deformations to an object's surface, moving the camera viewpoint, and changing the lighting. For each frame of the animation, the rendering program generates a single image which is stored on the computer. After all of the images are generated, they are combined with the original piece of music into a movie. The final result is an animation sequence that is synchronized to the music in a smooth and visually appealing manner. The system does not, however, run in real-time, and it is not interactive.

Various programs (Winamp visualization plugins, for example) have been developed that respond to audio in real-time to deform an animation sequence. At a broad level, these programs perform the steps of: mapping different frequency ranges of the audio to different parts of the graphics scene and moving parts of the graphics scene in response to this audio. Real-time animation is achieved by a processing loop of:

1. audio feature extraction
2. geometry computation
3. geometry rendering performed individually for each animation frame.

However, if such a mapping is done directly, without any conditioning of these time-varying energy signals, the visual results are not perceptually very pleasing. Additionally, because the auditory feature extraction and geometry computation must be performed for each frame, the audio and video outputs are not synchronized.

Accordingly, improved audio-driven graphics techniques are continually being developed.

SUMMARY OF THE INVENTION

Provided is an improved method and system to drive transformations of a visual representation, in real-time, with characteristics extracted from an audio signal. In this manner, transformations of the visual representations are displayed concurrently with extraction of the audio signals characteristics, which facilitates pipeline processing and user interaction with the processing. According to one aspect of the invention, the method includes extracting characteristics of the audio signal, varying the representation in response to the characteristics, defining a modified representation; and periodically, providing a visual display of the modified representation synchronized to the audio signal, while extracting characteristics of the audio signal.

The system includes a processor, a buffer, in data communication with the processor, with the buffer holding digital data representing an audio signal, and a memory, in data communication with both the buffer and the processor, the memory storing a program to be operated on by the processor, the program including information corresponding to an object, a first process for capturing a frequency domain representation of a time segment of the audio signal, extracting characteristics therefrom, and forming a conditioned control signal based on extracted characteristics, and a second process to vary parameters associated with the object in response to the conditioned control signal while capturing an additional time segment of the audio signal, with the second process defining a modified representation having deformation magnitudes controlled by the conditioned control signal.

According to another aspect of the invention, the characteristics extracted from the audio signal yield information often correlated with the musical beat, including the beat energy, i.e., amplitude, and delay between beats. A smoothed conditioned control signal respond quickly to an increase in magnitude of the energy characteristic of the audio signal. However, if the magnitude of the energy characteristic then decreases suddenly the smoothed conditioned signal decreases slowly so that a controlled deformation appears more pleasing to a viewer. Specifically, one or more functions are stored in the aforementioned memory and remap vertices corresponding to the one or more objects in response to the magnitude and timing of the conditioned control signal, thereby varying the visual representation of the one or more objects. Characteristics other than the beats of the audio signals may be extracted, such as phase information, timbre information, frequency information and the like.

According to a further aspect, the system may include an audio system and a display. The sound is generated from a delayed audio signal, in this manner, the transformations of the objects are displayed in synchronization with the sound corresponding to the portion of the audio signal from which the characteristics were extracted to create the aforementioned transformations.

According to an additional aspect of the invention, an animation function control signal is triggered when the conditioned control signal increases rapidly in magnitude and is set equal to the output of a function generator when the conditioned control signal begins decreasing in magnitude.

According to a further aspect, if a minimum time period has not expired before the conditioned control signal again increases in magnitude a new animation control signal is not triggered.

Other features and advantages of the invention will be apparent in view of the following detailed description and appended drawings.

DESCRIPTION OF THE SPECIFIC EMBODIMENTS

Figure 1A:
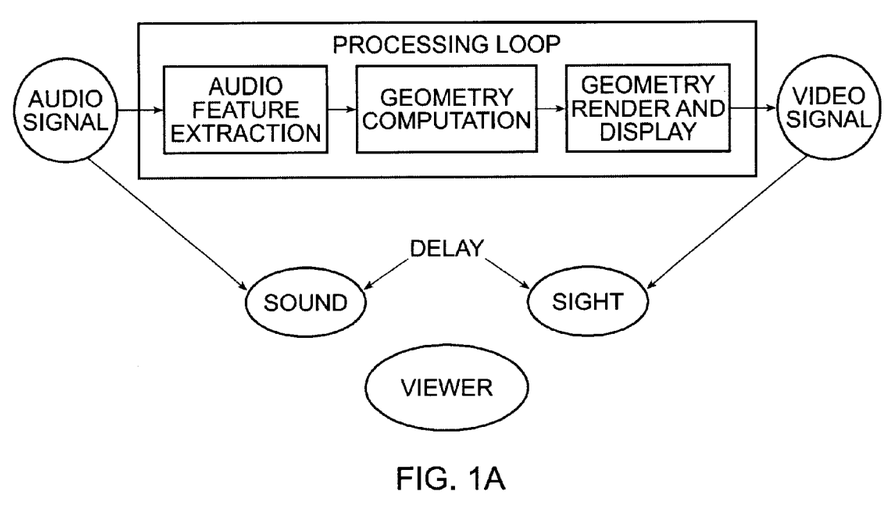
FIG. 1A is a schematic diagram of a basic process loop.

The improved animation loop utilized in a preferred embodiment can best be explained through some simple diagrams. The basic loop is depicted in FIG. 1A. With the basic animation loop, the viewer hears the audio directly from the source. For each animation frame, the loop records a segment of audio, processes, and then displays the resulting geometry. Because the animation loop takes a finite amount of time, a delay is introduced between the audio that the user hears and the video that the user sees. For animations rendered at rates on the order of 30 frames per second, this delay results in a very noticeable loss of synchronization between the audio and video.

Figure 1B:
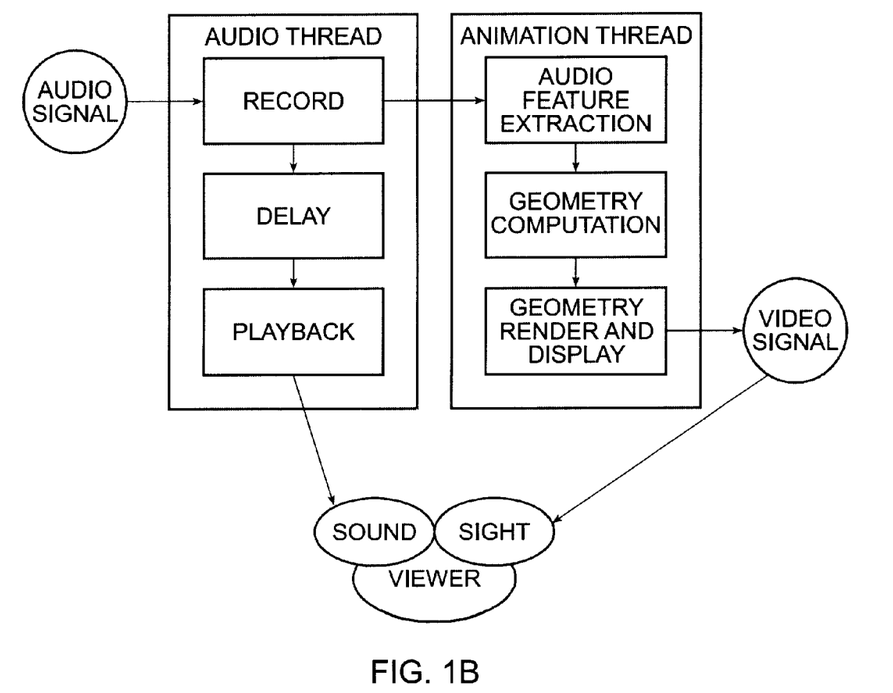
FIG. 1B is a schematic diagram of an improved processing loop utilized by a preferred embodiment of the invention.

In order to better synchronize the audio and video, the presently described embodiment uses an improved processing loop, depicted in FIG. 1B, in which the audio is delayed. The loop first records the audio into a record buffer, inserts a delay equal to the time it takes to render a frame, and sends it to a playback buffer. It then takes the audio in the record buffer and proceeds as in FIG. 1A. By adding this delay, the audio and video are now properly synchronized.

Figure 2:
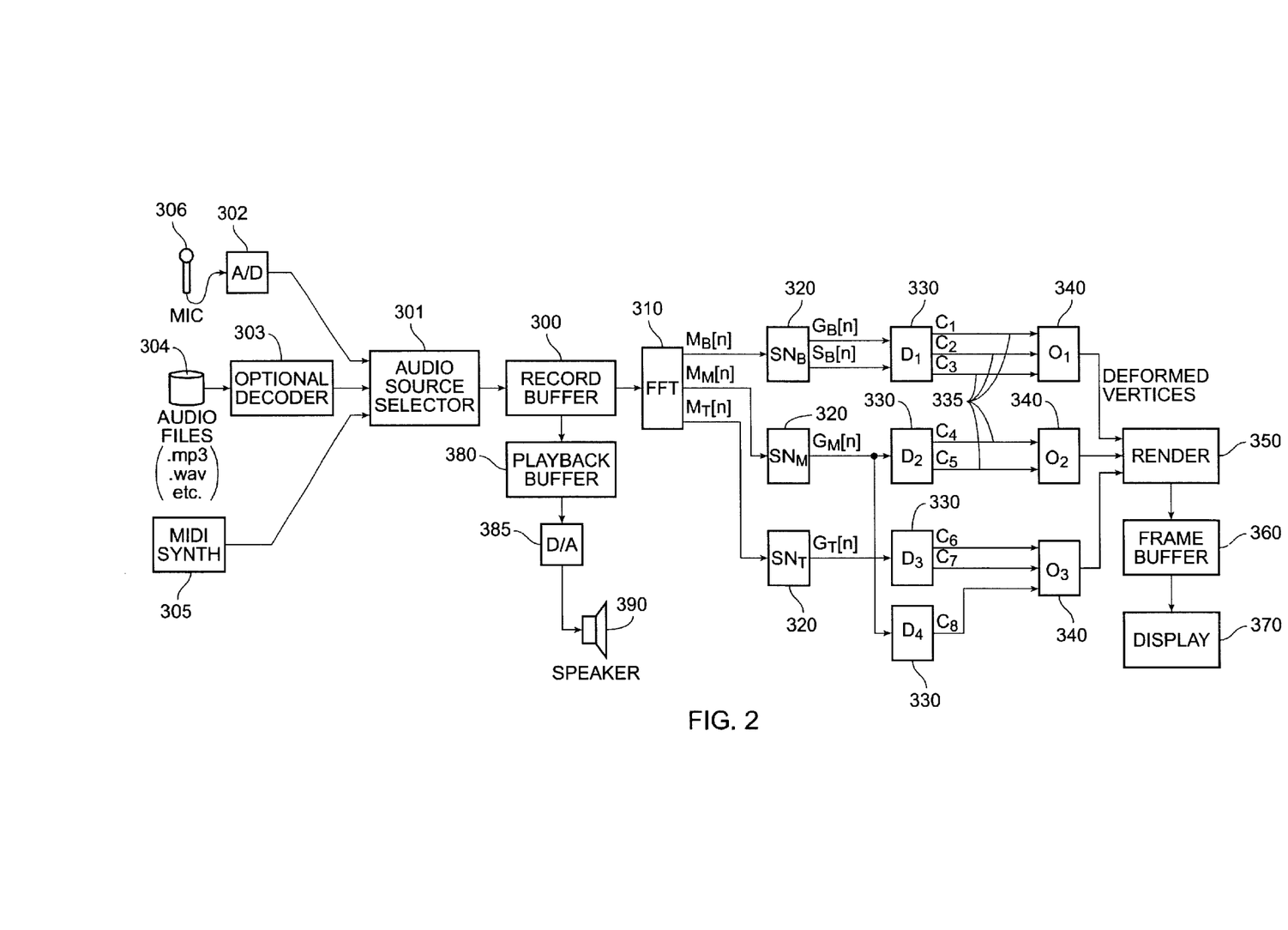
FIG. 2 is a block diagram of a system for implementing the invention.

An overview of the operation of the preferred embodiment is depicted in FIG. 2. Referring to FIG. 2, an audio data stream is selected using selector 301. Possible inputs to this selector include, but are not limited to, microphone 306 digitized by A/D converter 302, compressed audio files on disk 304 as decoded by decoder 303, and MIDI synthesizer output 305. A record buffer 300 for holding a frame's (a frame is defined as one animation frame, e.g. 4,410 samples if the frame rate is 10 Hz) worth of audio data is output to an FFT block 310 and simultaneously to playback buffer 380. The playback buffer is sent to a D/A converter 385 and speaker 390 for delayed playback of the input audio. The frequency bins output by the FFT block 310 are averaged within three bands (labeled Bass, Midrange, and Treble) and processed by a smoothing/normalizing filter block 320. The smoothed, normalized control signals, $G_x[n]$ and $S_x[n]$ (where x is B, M, or T, for Bass, Midrange, and Treble versions thereof) are applied to deformation modules $D_n$ 330 which then create animation function control signals $C_n$ 335 to deform objects $O_n$ 340 according to the magnitude of the animation function control signals. The deformed vertices from the objects 340 are then sent to a render block 350 which converts the vertices into scan-converted polygons which are in turn placed into frame buffer 360 before being output to the computer display 370. The specific routing of animation function control signals $C_n$ to the objects $O_n$ is just an example, showing that multiple deformation types can act on one object (as in $O_3$) and that each deformation can produce multiple deforming animation function control signals (as in outputs $C_1$, $C_2$, and $C_3$ of deformation $D_1$).

In a preferred embodiment the FFT block 310, smoother blocks 320, deformation blocks 330 object blocks 340 and render block 350 are implemented as software modules.

Figure 3:
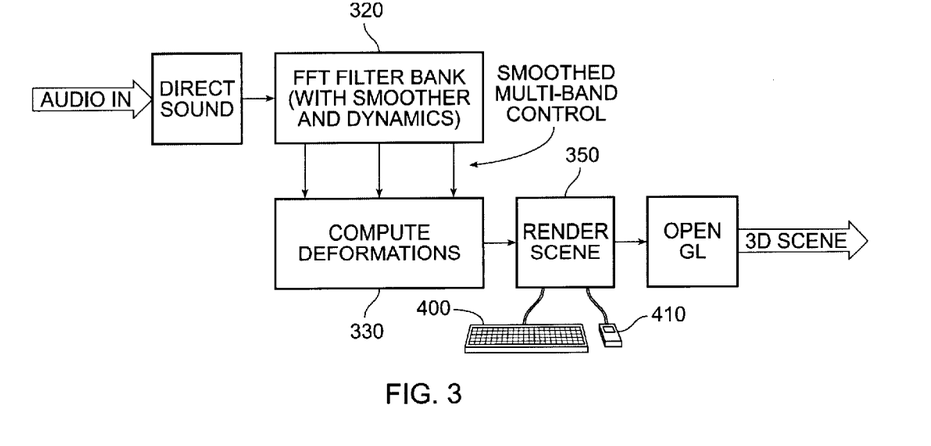
FIG. 3 is a block diagram depicting the relationships between software blocks of a preferred embodiment.

As can be seen in FIG. 3, in a preferred embodiment, two APIs provide much of the remaining functionality: DirectSound™, and OpenGL™. DirectSound™ implements the AudioIn() and AudioOut() functions discussed below, while OpenGL™ implements the 3D graphics rendering (lighting, 3-d transformation, projection and scan-conversion). In a currently preferred embodiment, the application is single threaded, although multi-threaded embodiments have also been implemented, with audio processing in one thread and graphics processing in another.

At the beginning of each animation frame, one frame-time worth of audio samples are read in via the DirectSound Input port. These samples are then passed to the FFT-based filter bank 320. This filter bank can be set up to produce multiple bands of smoothed, AGC'd (Automatic Gain Control) control data. In a currently preferred embodiment, there are three independent bands: 0–300 Hz, 1500–2800 Hz, and 3700–6300 Hz. Smoothed versions of these signals, which tend to pass on salient transient information while suppressing low-level noise, are passed on to the deformation block. This block causes the vertices of the objects in the current scene to be perturbed according to the control information. Each object in the scene can have multiple deformations applied to it. Once all the deformations have been calculated for each object, rendering begins. These steps are illustrated in the following pseudo-code which represents the main processing loop:

```
MainLoop( ) {
        OneFrame = UpdateFrameSize( );        // Compute how many
                                              //samples in a video frame,
                                              //base on current frame rate.
        AudioIn(OneFrame, RecordBuffer);      // read a frame of audio into Record Buffer
        AudioOut(RecordBuffer,OneFrame);      // play this audio back (net effect is to
                                              // delay the audio one frame)
        filterbank.Filter(RecordBuffer);      //run the FFT on a frame of
                                              //audio
        filterbank.NormalizeAmplitude( );            //compute smoothed, AGC'd
                                                     //control values
        InitFrame( );                                //clear the graphics frame
        camera.Move (filterbank);             // Move camera based on audio
        camera.Apply( );                      // Compute scene projection based on camera
        lights.Update(filterbank);            // Update lighting based on audio
        lights .Apply( );                     // Apply lighting
        RenderStaticObjects( );               // Draw any non-deformable objects
        for     (i = 0; i < numshapes; i++) {
                shape [i] .ComputeDeformations( );   // apply all deformations
                                                     //acting on this shape
                shape [i] . ComputeNormals( );       // compute surface normals of
                                                     // the deformed shape (for lighting)
                shape[i] .Draw( );                   // render this deformed object
                                                     //to the frame buffer
        }
        EndFrame( );                                 // swap buffers (wait for
                                                     //vertical blanking)
}
```

The following is a discussion of the specific stages in this main animation loop.

The overall rendering procedure uses a double-buffered approach to improve perceived image quality. Double buffering is a standard technique in computer graphics, wherein the contents of a single animation frame are rendered into an off-screen buffer. Once all the objects in the frame have been rendered, a buffer swap is initiated, wherein the off-screen buffer is now selected for display, and the buffer that had been displayed now becomes the new off-screen buffer into which the subsequent frame will be rendered.

At the beginning of the loop, the number of audio samples corresponding to a single animation frame (OneFrame) at the current frame rate is computed. For example, if the audio sample rate is 44,100 Hz, and the animation frame rate is 20 Hz, OneFrame would be 2,205 samples (44,100 divided by 20). This many samples are then read into the record buffer from the AudioIn port. This read will block until enough samples are available to begin processing the next frame (i.e. OneFrame worth). Once these samples have been read in, they are immediately written to the AudioOut port (where the playback buffer 380 of FIG. 3 resides). The act of reading and subsequently writing out one frame of audio enforces one frame (in our example, 50 ms) of delay in the audio.

The analysis filter bank will then operate on the data in the record buffer, producing control information which will be used later in the loop to control camera position, lighting, object deformations, etc. A normalization procedure is applied, so that the animation responds equally well to both loud and soft passages in the input audio. This procedure is described below.

Before any objects are rendered, it is necessary to clear out the animation buffer so the new frame contains only new animation data. InitFrame() accomplishes this, along with any other tasks that need to be reset (for example, the 3D transformation matrix).

Then, the camera position is computed, based on the smoothed output from the analysis filterbank and user inputs (e.g., from a mouse). The user could reposition using mouse x and y coordinates. This position is then used in the Apply() procedure to apply a perspective transformation reflecting the new camera position. Next, the currently active lighting model is applied. Here, various parameters such as light intensity, position, and hue may be applied, as well as any shading method (e.g., flat-shading vs. Gouraud shading) that may be active. In the preferred embodiment, these parameters may be affected by the analysis filterbank.

Next, any static objects in the scene (those which are not deformed by the output of the audio analysis) are rendered into the (off-screen) frame buffer. Following this, all of the deformed objects are rendered. For each such object, three steps are performed. First the deformations (described below) are applied to the vertex set representing the object. Next, the normal vectors are computed from this deformed vertex set (in order to perform accurate lighting computations). Finally, the object is rendered into the (off-screen) frame buffer, based on the deformed vertices and normal vectors. Note that while a preferred embodiment is described wherein the vertices are deformed from some initial state in response to the audio, it is also possible to derive the vertex set directly from some parameters in the audio analysis. Such vertex sets are computed "from scratch" at each animation frame, rather than being based on some prior vertex set.

During rendering user inputs from a keyboard 400 or mouse 410 can be utilized to implement mode switching. For example, the w-key on the keyboard 400 toggles wireframe mode on and off. Other examples, and their bindings, include:

T-texture on/off;
C-color effects on/off;
S-strobe light on/off;
L-colored lights on/off;
F11-flat/smooth shading;
F1-randomize object colors;
F5-change deformation type;
keys 1–8-change scenes;

p-pause camera;

left-mouse-button-drag-camera pan left-right, up-down;

right-mouse-button-drag-camera zoom in/out.

Once all the objects have been rendered, an EndFrame() procedure is invoked, which initiates the buffer-swapping operation described above. To prevent the buffer swapping from manifesting visual artifacts, it is typically performed during the vertical blanking interval. In normal operation, the animation process will take slightly less than one video frame time, so that the wait for vertical blanking is small.

A detailed operation of the smoothing/normalizing filter block 320 utilized in a preferred embodiment will now be described.

Let the variable n index the series of animation frames, and let the variable m index the series of half-overlapping DFT's computed from the audio stream during a single animation frame n. Let this series of DFT's be represented by $H_{n,m}[k]$, where k is the DFT bin number. Associated with each control signal is a frequency range (sub-band) defined by the DFT bin boundaries bmin and bmax. The first step in computing a control signal is to compute the maximum energy in decibels within the specified frequency range over a single animation frame. This is given by $$M[n] = \max_m \left\{ 10\log_{10}\left( \sum_{k=bmin}^{bmax} |H_{n,m}[k]|^2 \right) \right\}. \quad (1)$$

From this maximum energy signal, two types of control signals may be generated: a smooth normalized signal, S[n], and a gain-normalized signal, G[n].

To compute the smooth normalized signal, a normalized saturating function is first applied to the maximum energy signal:

$$\hat{M}[n] = f\{M[n], SdBmin, SdBmax\}, \quad (2)$$

where $$f(x, \min, \max) = \begin{cases} 0 & x < \min \\ \dfrac{x - \min}{\max - \min} & \min < x < \max, \\ 1 & x > \max \end{cases} \quad (3)$$

An adaptive single-pole smoothing filter is then applied to produce S[n]:

$$S[n] = \alpha[n]S[n-1] + (1-\alpha[n])\hat{M}[n]. \quad (4)$$

The smoothing filter pole, $\alpha[n]$, is given by $$\alpha[n] = \text{pow}\{0.5, \tau(\hat{M}[n], \hat{M}[n-1], Sthresh, Sdecaymin, Sdecaymax)^{-1}\}, \quad (5)$$

where $\tau(x,y,thresh,min,max)$ is a half-amplitude decay-time function computed according to $$\tau(x, y, thresh, \min, \max) = \quad (6)$$
$$\begin{cases} \dfrac{x - thresh}{1 - thresh}(\min - \max) + \max & \text{if } x > y \text{ and } x > thresh \\ \max & \text{otherwise} \end{cases}.$$

Computation of the gain-normalized signal is similar to that of the smooth normalized signal, with the addition of a signal-adaptive normalization factor:

$$G[n] = f\{M[n]/N[n], GdBmin, GdBmax\}, \quad (7)$$

where f(x,min,max) is the same as in (3) and N[n] is a normalizing signal computed as $$N[n] = \beta[n]N[n-1] + (1-\beta[n])M[n-1]. \quad (8)$$

The gain normalization filter pole, $\beta[n]$, is given by $$\beta[n] = \text{pow}\{0.5, \tau(G[n], G[n-1], Gthresh, Gdecaymin, Gdecaymax)^{-1}\}, \quad (9)$$

where $\tau(x,y,thresh,min,max)$ is the same as in (6).

When computing S[n], the parameters SdBmin and SdBmax define the range of audio intensity over which S[n] responds. The adaptive smoothing filter described in (4)–(6) is designed so that when the energy of the audio signal within the specified frequency range increases rapidly, the signal S[n] also increases rapidly. If the energy then decreases rapidly, however, $S_i[n]$ decreases more slowly from its maximum. The exact rate at which S[n] increases and decreases is controlled by the parameters Sdecaymin and Sdecaymax. With these parameters properly tuned, use of the signal S[n] to directly control parameters in the graphics scene allows the graphics to respond immediately to the music while retaining a perceptually pleasing smoothness of motion.

The computation of G[n] adaptively compresses energy fluctuations about any average signal energy into a fixed dynamic range, providing a control signal that is independent of the average signal energy. The normalizing signal N[n] behaves similarly to S[n], growing rapidly if the audio signal energy grows rapidly, but always decreasing slowly and smoothly. The effect is that G[n] normalizes quickly to sudden bursts in energy and is slower to normalize back to lower energy levels. With GdBmin, GdBmax, Gdecaymin, and Gdecaymax chosen appropriately, the local maxima of G[n] are good indicators of transient events in the audio signal. These local maxima may be used to trigger the onset of functions that animate various parameters in the graphics scene. Typically, these functions decay smoothly from 1 to 0 over some finite number of animation frames—the raised cosine is a very useful example. Oftentimes a signal S[n] is used in conjunction with the animation functions triggered from a signal G[n]. The animation function controls a pattern of motion, and the signal S[n] is used to modulate the amplitude or degree of this motion. This way, independent control over the triggering of animation events and the amplitude of animation events is achieved.

The exact manner in which G[n] triggers the animation functions in the preferred embodiment can be described in pseudo-code. The signal G[n] serves as an input to an animation function generator (residing within each deformation module) which produces K simultaneous outputs, each of which control some aspect of the graphics scene. The outputs are triggered according to the following algorithm, which is repeated before every new animation frame is rendered.

if (time since last output was triggered)<(minimum allowable time interval),
i=index of the output that was last triggered else,

```
if(time since last output was triggered)<(minimum allowable time interval),
    i = index of the output that was last triggered
else,
    i = index of the output with the current minimum value
end
```

-continued

```
if G[n] > output_i,
    // Trigger the beginning of an animation function
    output_i = G[n]
    time elapsed_i = 0
    time since last output was triggered = 0
end
// Update all of the outputs
for j = 1 to K,
    if (time elapsed_j) < (decay time),
        // Compute raised cosine decay function
        output_j = G[n]*(0.5*cosine ( pi*(time elapsed_j)/(decay time) ) + 0.5)
    else,
        output_j = 0
    end
    time elapsed_j += frame interval
end
time since last output was triggered += frame interval
```

Figure 4:
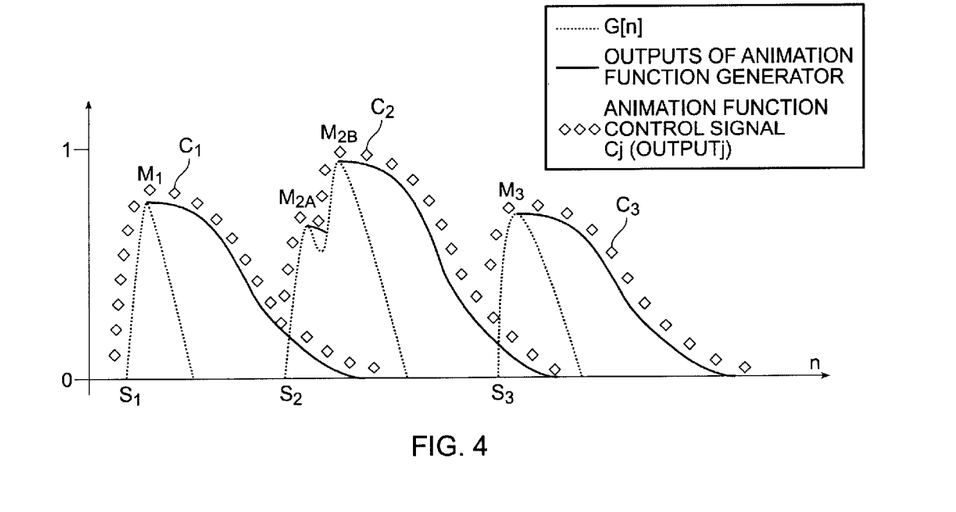
FIG. 4 is a graph depicting the triggering of animation function control signals.

FIG. 4 depicts the results of this algorithm when K=3. Outputs 1–3 are triggered at times $S_1$–$S_3$, respectively. Each output tracks G[n] until G[n] reaches a local maximum. At these times, $M_1$–$M_3$, each output begins to decay according to a raised cosine function. We also note that after output 2 begins to decay at time $M_{2A}$, G[n] increases to a value greater than output 2 before the minimum allowable time between triggering of separate animation functions is reached. As a result, output 2 again tracks G[n] until G[n] reaches a new local maximum at time $M_{2B}$, after which output 2 again starts to decay. The animation function control signals, $c_n$ of FIG. 2, are equal to the output$_j$ values.

Before being used to control some aspect of the graphics scene, the animation function control signals, $c_n$, are optionally multiplied by S[n]. In so doing, loud passages in the audio will manifest a large series of deformations (whose fine structure is defined by G(n)) while soft passages will manifest a small series. These modulated outputs are particularly useful for controlling bump-like deformations that appear on the surface of objects in the graphics scene. Each time an output of the animation function control signal is triggered and increases from zero, a new bump is formed. The time evolution of the bump is then controlled by the associated output of the animation function generator. If the animation function generator generates more than one animation function control signal output, then multiple instances of a given bump type can co-exist on an object surface with each bump at a different state of decay.

The use of G[n] and [Sin] to audio-drive the deformation of a shape will now be described in the context of causing a cosine-based deformation on the surface of a sphere. Each point on the sphere (or other object) is represented by an (x, y, z) coordinate in a 2-d array of points (for example, Sphere[i][j]). Each element also has a normal vector (n[i][j]) specifying the normal to the sphere (or other object) at point (i,j). Having the normal vector makes it easier to do the deformation.

The 2-d array is indexed with an (i,j) coordinate. A deformation is computed as a function of i and j. For example, the deformation amount may be determined by:

deformation (i,j)=amplitude*cos($f_1$* i+$f_2$*j)

where amplitude specifies how much the sphere will be deformed, $f_1$ specifies frequency in the i (increasing longitude) direction and $f_2$ specifies frequency in the j (increasing latitude) direction.

To initialize the (undeformed) shape, each vertex is assigned x, y, and z coordinates given by the prototype shape (sphere in our example).

DefShape[i][j][x]=Sphere[i][j][x]
DefShape[i][j][y]=Sphere[i][j][y]
DefShape[i][j][z]=Sphere[i][j][z]

DefShape is then deformed in the direction of normal vector n.

This becomes three equations in code, i.e.,

DefShape[i][j][x]+=deformation[i][j]*n[i][j][x]
DefShape[i][j][y]+=deformation[i][j]*n[i][j][y]
DefShape[i][j][z]+=deformation[i][j]*n[i][j][z]

where n[i][j][x] is the x-component of the normal vector at point (i,j) (and so on, for the y- and z- components). In this way, the bump deformations are always applied in a manner which is normal to the surface. Viewing the earth as a special case of a sphere, deformations are like elevations above sea level.

Using the above-described deformation as an example, the gain normalized signal, G[n], is utilized to trigger the initiation of a bump deformation when a transient (sudden increase in energy) is detected in the audio signal. The animation function control signal, described above, is typically supplied as amplitude in the deformation equation. If S[n] is used to modulate the animation function control signal, then the rate at which amplitude increases and decreases is modulated by controlling the parameters Sdecaymin and Sdecaymax to provide a visually pleasing audio-driven visual display.

Another type of deformation which is particularly suitable for use with the invention is the crawl-type deformation. It is well-known that textures can be mapped onto the surfaces of shapes. In this case, the control signal is utilized to translate the mapping so that the image mapped appears to "crawl" over the surface of the object. Other transformations can be utilized to distort the mapped image in visually interesting ways. Each vertex on the shape's surface has a corresponding texture coordinate (u,v) which determines which pixel in the texture array will be used to color this point on the surface. By modifying these texture coordinates based on the control signals, crawling, swirling, and other visual effects can be manifested in the texture.

The invention has now been described with reference to the preferred embodiments. Alternatives and substitutions will now be apparent to persons of ordinary skill in the art. For example, means other than the FFT can be used to extract frequency dependent energy information from the audio signal. Also, particular filter embodiments have been described to condition the gain-normalized and smooth normalized conditioned control signals. Alternative filters structures and normalization strategies could be utilized within the scope of the invention. Further, deformations other than those described here are suitable for use with the invention. Additionally, user inputs may come from other sources, e.g., a joystick, and the particular mode switches and binding are only examples. Accordingly, it is not intended to limit the invention except as provided by the appended claims.

What is claimed is:

1. A method of driving a computer generated animation with an audio signal, with the animation comprising a number of frames rendered sequentially at a frame rate, with each frame for displaying at least a first object, the method comprising the steps of:

for a current frame, capturing a frame's worth of said audio signal to obtain a captured segment of the audio signal and extracting an energy characteristic of the captured segment of the audio signal;

utilizing the energy characteristic of the captured segment to generate a conditioned control signal having an amplitude which responds rapidly to a rapid increase in magnitude of energy characteristic;

when the conditioned control signal amplitude increases rapidly in magnitude, initiating a deformation of the first object to be rendered in the current frame; and delaying the conversion of the captured segment of the audio signal, corresponding to the current frame, into a sound signal until the current frame is rendered and displayed to synchronize the occurrence of increase in magnitude of the energy characteristic to the display of the initiation of the deformation.

2. The method as recited in claim 1 wherein said steps of extracting an energy characteristic of the captured segment of the audio signal further and generating a conditioned control signal further comprises the steps of:

performing a series of half-overlapping discrete Fourier transforms (DFTs) on the captured segment;

determining a maximum energy signal for the captured signal based on the frequency bins of one of the DFTs; and normalizing the maximum energy signal from different captured segments to form a normalized energy signal as a control signal.

3. The method as recited in claim 1 further including the steps of:

breaking said audio signal into a plurality of sub-bands;

calculating a conditioned control signal for each sub-band; and utilizing the conditioned control signals to control different deformations based on energy characteristics of the different sub-bands.

4. The method of claims 1 further comprising the step of:

compressing the amplitude of the conditioned control signal into a fixed dynamic range so that the amplitude of peaks of the conditioned control signal is independent of average energy characteristic amplitude.

5. A method for audio-driving an animation sequence to deform an object displayed by the sequence, with the animation sequence comprising a series of frames displayed sequentially and separated in time by a frame period, with the method comprising the following steps performed during a frame period:

storing a segment of an audio driving signal corresponding to the frame period;

while delaying the playback of the segment of the audio driving signal:

processing said segment of said audio driving signal to extract a maximum energy characteristic of the segment;

filtering and normalizing said maximum energy characteristic to generate a smoothed conditioned control signal with an amplitude that increases rapidly when the maximum energy characteristic of the audio signal increases rapidly and decreases slowly from its maximum regardless of whether the energy then decreases rapidly;

based on the amplitude of the conditioned control signal, calculating the magnitude of a shape deformation having a deformation magnitude modulated by the amplitude of the smoothed conditioned control signal; and rendering the frame with a deformation magnitude of a deformation of the first object modulated by the smoothed conditioned control signal amplitude;

subsequent to rendering, displaying a rendered frame and converting the segment of the audio signal to sound so that a displayed frame is synchronized with the audio driving signal.

6. A system comprising:

a processor;

a buffer, in data communication with the processor, the buffer holding digital data representing an audio signal; and a memory, in data communication with both the buffer and the processor, the memory storing a program to be executed by the processor, the program including information corresponding to an object, a first process for capturing a time segment of the audio signal, extracting an energy characteristic, indicating a magnitude of signal energy of the time segment, therefrom, and utilizing said energy characteristic to form a smoothed conditioned control signal having an amplitude which increases rapidly when the signal energy magnitude increases rapidly and the smoothed conditioned control signal having an amplitude which decreases slowly when the magnitude of the frequency energy decreases rapidly; and a second process to vary object deformation function amplitudes associated with the object in response to the amplitude of the smoothed conditioned control signal while capturing an additional time segment of the audio signal, thereby defining a modified representation.

7. The system as recited in claim 6 wherein the object is stored in the memory as a plurality of bins, a first subset of which defines an array of vertices and a second subset of which defines a plurality of normals to the object.

8. The system as recited in claim 6 further including a visual display, in data communication with both the memory and the processor to produce a visual image of the modified representation, an audio generating device connected to a playback buffer wherein the buffer includes an output coupled to transmit audio information to both the memory and the playback buffer, with the audio generating device being adapted to generate sounds in response to signals received from the playback buffer and the playback buffer having a delay associated therewith sufficient to synchronize the visual image with the time segment.

9. The system of claim 6 wherein said second process further:

utilizes the energy characteristic of the captured segment to generate a conditioned control signal having an amplitude which responds rapidly to a rapid increase in magnitude of energy characteristic; and when the conditioned control signal amplitude increases rapidly in magnitude, initiates a deformation of the first object to be rendered in the current frame.

10. The system of claim 7 further comprising:

a user input device;

and wherein said second process responds to said user input device to implement user controlled mode switching during rendering of the visual representation.

11. A computer program product that controls a computer to vary representations in accordance with an audio signal, comprising:

for a current frame, code for capturing a frame's worth of said audio signal to obtain a captured segment of the audio signal and extracting an energy characteristic of the captured segment of the audio signal;

code for utilizing the energy characteristics of the captured segment to generate a conditioned control signal which responds rapidly to a rapid increase in magnitude of energy characteristic;

code for initiating a deformation of a first object to be rendered in the current frame when the conditioned control signal increases rapidly in magnitude;

code for delaying the conversion of the captured segment of the audio signal, corresponding to the current frame, into a sound signal until the current frame is rendered and displayed to synchronize the occurrence of increase in magnitude of the energy characteristic to the visual initiation of the deformation.

12. The computer program product as recited in claim 11 wherein the code to extract characteristics of the audio signal includes code to divide the signal into a plurality of audio streams.

13. The computer program product recited in claim 11 further comprising:

code for filtering and normalizing said energy characteristic to generate a smoothed conditioned control signal with an amplitude that increases rapidly when the maximum energy characteristic of the audio signal increases rapidly and decreases slowly from its maximum regardless of whether the energy then decreases rapidly;

code for calculating the magnitude of a shape deformation having a deformation magnitude modulated by the amplitude of the smoothed conditioned control signal based on the amplitude of the smoothed conditioned control signal; and code for rendering the frame with a deformation magnitude modulated by the smoothed conditioned control signal amplitude.

14. A method of driving a computer generated animation with an audio signal, with the animation comprising a number of frames rendered sequentially at a frame rate, with each frame for displaying at least a first object, the method comprising the steps of:

for a current frame, capturing a frame's worth of said audio signal to obtain a captured segment of the audio signal and extracting an energy characteristic of the captured segment of the audio signal;

utilizing the energy characteristic of the captured segment to generate a first conditioned control signal which responds rapidly to a rapid increase in magnitude of energy characteristic;

when the conditioned control signal increases rapidly in magnitude, initiating a deformation of the first object to be rendered in the current frame;

filtering and normalizing said energy characteristic to generate a smoothed conditioned control signal with an amplitude that increases rapidly when the maximum energy characteristic of the audio signal increases rapidly and decreases slowly from its maximum regardless of whether the energy then decreases rapidly;

based on the amplitude of the smoothed conditioned control signal, calculating the magnitude a shape deformation having a deformation magnitude modulated by the amplitude of the smoothed conditioned control signal;

rendering the frame with the firs object deformed according to a deformation magnitude modulated by the smoothed conditioned control signal amplitude; and delaying the conversion of the captured segment of the audio signal, corresponding to the current frame, into a sound signal until the current frame is rendered and displayed to synchronize the occurrence of increase in magnitude of the energy characteristic to the display of the initiation of the deformation.

15. The method of claim 14 further comprising the step of:

responding to user input to implement user controlled mode switching during rendering of the current frame.

16. A method of driving a computer generated animation with an audio signal, with the animation comprising a number of frames rendered sequentially at a frame rate, with each frame for displaying at least a first object, the method comprising the steps of:

for a current frame, capturing a frame's worth of said audio signal to obtain a captured segment of the audio signal and extracting an energy characteristic of the captured segment of the audio signal;

utilizing the energy characteristic of the captured segment to generate a conditioned control signal having an amplitude which responds rapidly to a rapid increase in magnitude of energy characteristic;

providing a function generator for providing function generator output signal amplitude;

when the conditioned control signal increases rapidly in magnitude, triggering an animation function control signal having an amplitude equal to the amplitude of the conditioned control signal when the conditioned control signal is increasing in magnitude;

setting the animation function control signal amplitude to the function generator output amplitude when the conditioned control signal amplitude begins decreasing; and utilizing the animation function control signal to initiate and control characteristics of a deformation to the first object.

17. The method of claim 16 further comprising the steps of:

selecting a minimum time period;

if the conditioned control signal, subsequent to decreasing, suddenly increases in magnitude before expiration of the minimum time period, setting the amplitude of a current animation function control signal equal to the amplitude of the conditioned control signal;

if the conditioned control signal, subsequent to decreasing, suddenly increases in magnitude after expiration of the minimum time period, triggering a new animation function control signal and setting the amplitude of the new animation function control signal equal to the amplitude of the conditioned control signal.

18. A system of driving a computer generated animation with an audio signal, with the animation comprising a number of frames rendered sequentially at a frame rate, with each frame for displaying at least a first object, the method comprising the steps of:

means for capturing a current frame's worth of said audio signal to obtain a captured segment of the audio signal and extracting an energy characteristic of the captured segment of the audio signal;

means, coupled to receive the captured segment, for utilizing the energy characteristic of the captured segment to generate a first conditioned control signal which responds rapidly to a rapid increase in magnitude of an energy characteristic;

means, responsive to the first conditioned control signal, for initiating a deformation of the first object to be rendered in the current frame when the conditioned control signal increases rapidly in magnitude;

means for filtering and normalizing said energy characteristic to generate a smoothed conditioned control signal with an amplitude that increases rapidly when the maximum energy characteristic of the audio signal increases rapidly and decreases slowly from its maximum regardless of whether the energy then decreases rapidly;

means for calculating the magnitude a shape deformation having a deformation magnitude modulated by the amplitude of the smoothed conditioned control signal based on the amplitude of the smoothed conditioned control signal;

means for rendering the frame with the first object deformed according to a deformation magnitude modulated by the smoothed conditioned control signal amplitude; and means for delaying the conversion of the captured segment of the audio signal, corresponding to the current frame, into a sound signal until the current frame is rendered and displayed to synchronize the occurrence of increase in magnitude of the energy characteristic to the display of the initiation of the deformation.

* * * * *